United States Patent
Ware

(10) Patent No.: US 10,617,072 B2
(45) Date of Patent: Apr. 14, 2020

(54) DECODER-SOLENOID VALVE CONTROL ASSEMBLY FOR A CODE CONTROLLED WATERING SYSTEM

(71) Applicant: NATBREWAY PTY LTD., Brendale (AU)

(72) Inventor: John Antony Ware, Szentgyörgyvölgy (HU)

(73) Assignee: NATBREWAY PTY LTD., Brendale (AU)

( * ) Notice: Subject to any disclaimer, the term of this patent is extended or adjusted under 35 U.S.C. 154(b) by 257 days.

(21) Appl. No.: 15/574,904

(22) PCT Filed: Nov. 24, 2016

(86) PCT No.: PCT/HU2016/050057
§ 371 (c)(1),
(2) Date: Nov. 17, 2017

(87) PCT Pub. No.: WO2018/096372
PCT Pub. Date: May 31, 2018

(65) Prior Publication Data
US 2019/0216026 A1 Jul. 18, 2019

(51) Int. Cl.
*F16K 27/02* (2006.01)
*A01G 25/16* (2006.01)
(Continued)

(52) U.S. Cl.
CPC ............ *A01G 25/16* (2013.01); *F16K 27/029* (2013.01); *F16K 27/048* (2013.01); *F16K 31/046* (2013.01)

(58) Field of Classification Search
CPC ............................. F16K 31/046; A01G 25/16
See application file for complete search history.

(56) References Cited

U.S. PATENT DOCUMENTS 3,989,066 A * 11/1976 Sturman .............. A01G 25/162
137/624.2
5,797,417 A 8/1998 DeLattre et al.
(Continued)

FOREIGN PATENT DOCUMENTS

EP 1103178 A1 5/2001

OTHER PUBLICATIONS

International Search Report for PCT/HU2016/050057 dated Aug. 16, 2016 submitted herewith (3 pages).
(Continued)

*Primary Examiner* — Matthew W Jellett
(74) *Attorney, Agent, or Firm* — Fitch, Even, Tabin & Flannery, LLP

(57) ABSTRACT

A valve control assembly for a watering system including a decoder unit and provided with valve control outputs, a solenoid releasably attachable to a valve. The decoder unit is arranged in a substantially cylindrical shaped decoder body having a central axis. The solenoid is arranged in a substantially cylindrical solenoid housing. The decoder body and the solenoid housing are releasably attachable together so that in attached position their axes fall in the same line and their edges along which they are united have respective conforming recesses that are fitted together and prevent angular displacement. In the interior of the decoder body and the solenoid housing in the connection zone a hollow space is defined. Control wires connect the decoder unit, with the solenoid are placed in the hollow space. The control wires having a length to permit dis-assembly and replacement of any of the decoder unit and the solenoid.

10 Claims, 2 Drawing Sheets

(51) Int. Cl.
*F16K 27/04* (2006.01)
*F16K 31/04* (2006.01)

(56) References Cited

U.S. PATENT DOCUMENTS

| | | | | |
|---|---|---|---|---|
| 6,283,139 B1 * | 9/2001 | Symonds | ............. | A01G 25/165 |
| | | | | 137/78.3 |
| 7,273,206 B2 * | 9/2007 | Sato | .................... | F16K 31/0627 |
| | | | | 251/129.02 |
| 7,359,769 B2 * | 4/2008 | Bailey | .................... | A01G 25/16 |
| | | | | 700/284 |
| 7,400,944 B2 | 7/2008 | Bailey et al. | | |
| 7,748,684 B2 * | 7/2010 | Ito | ....................... | F16K 31/0658 |
| | | | | 251/129.15 |
| 7,826,931 B2 | 11/2010 | Lorenz | | |
| 8,851,447 B2 * | 10/2014 | Crist | .................... | A01G 25/16 |
| | | | | 251/129.04 |

OTHER PUBLICATIONS

Written Opinion of the International Searching Authority (English) for PCT/HU2016/050057, 6 pages.

* cited by examiner

DECODER-SOLENOID VALVE CONTROL ASSEMBLY FOR A CODE CONTROLLED WATERING SYSTEM

The invention relates to a decoder-solenoid valve control assembly for a code controlled watering system.

In U.S. Pat. No. 7,826,931 and in its continuation in part U.S. Pat. No. 818,078 an integrated actuator coil and decoder module has been described for use in decoder based irrigation control systems. The object of the patent was the integration of the previously separate decoder and solenoid into a single unit that can be fitted to the valve that opens or closes the flow of water in an irrigation pipe. More particularly, the valve had a plunger, and in the assembled position of the device the solenoid had a cylindrical internal cavity for receiving the plunger, and upon coded control of the particular valve the coil of the solenoid was energized and moved the plunger to operate the valve. By the suggested integrated solution only a pair of wires had to be connected to the electrical line coming from a remote irrigation controller, and the connection between the output of the decoder and the solenoid was provided internally. The integral connection between the two parts of the devices renders replacement of any of the parts impossible, and if either the solenoid or the decoder requires service or replacement, this can be done only by the replacement of the whole integral unit.

Such decoder-valve assemblies are used in the field, and they are connected to a central control unit through long wires. It is known that electronic components are rather sensitive against high voltage pulses or shocks, which might get superimposed on the connection wire when there is a sudden change in the electric or magnetic field around the wire, which often happens during a stormy weather or if a lightning hits nearby. Such short high voltage pulses destroy the semiconductors in the electronic circuit and as a result the decoder will stop functioning.

There are known over-voltage or surge protection circuits which can prevent such effects in most of the cases, however, if the protection circuit is placed at a distance from the circuit to be protected, high pulses can be superimposed on the connection wire and the decoder remains unprotected.

Even in case of using state of the art surge protection circuits, the danger of malfunctions caused by lightning cannot be fully eliminated. While decoders are more sensitive against shocks and hazards, solenoids also do not last forever and over time their winding might become shorted or a wire path gets broken.

The object of the invention is to provide a decoder-solenoid valve control assembly for a code controlled watering system which retains the advantage of the prior device that only a pair of wires have to be connected thereto, and during use it forms a single mechanical unit, in which either one of the two parts can be replaced when needed.

A further objective is to provide and improved reliability against lightning hazards.

To attain these objectives a valve control assembly has been provided for a watering system supplied through wires that carries superimposed coded control information, and the assembly comprises a decoder unit connected with the supplying wires and has a decoder and a switch and provided with valve control outputs, and a solenoid that can be releasably attached to a valve in the system for controlling the same upon excitation received from the decoder unit and obtaining excitation from the valve control outputs of the decoder unit, wherein the improvement according to the invention lies in that the decoder unit is arranged in a decoder body having a substantially cylindrical shape and a central axis and the solenoid is arranged in a substantially cylindrical solenoid housing, the decoder body and the solenoid housing can be releasably attached together so that in attached position their axes fall in the same line and their edges along which they are united have respective conforming recesses that are fitted together and prevent angular displacement, and in the interior of the decoder body and the solenoid housing in the connection zone a hollow space is defined, and control wires connecting the decoder unit with the solenoid are placed in the space, and the wires have excess length that enable dis-assembly and in case of need replacement of either the decoder unit or the solenoid.

In a preferred embodiment, the decoder unit comprises a surge protection circuit connected between the wires and input of the decoder.

It is preferred if the decoder body has a hollow central shaft and the solenoid housing has a central shaft with a first part designed as a hollow cylinder opening towards said valve and a second part narrower than the first part and extending out of the open end of the solenoid housing and in assembled state the second part is introduced in the hollow interior of the central shaft of the decoder body to enable the releasable connection of the decoder body and the solenoid body.

For increasing reliability in a preferred embodiment before the assembly of the decoder body and the solenoid housing the interiors of both of them are filled separately by a self solidifying material.

An optimum layout is obtained if the control wires are wound in the form of a short coil in the space provided for them, and have a length between about 80 and 150 mm.

For displaying the actual status of the assembly the decoder unit includes a LED lamp indicating the status of the decoder unit.

The invention will now be described in connection with preferred embodiments thereof in which reference will be made to the accompanying drawings. In the drawing.

Figure 1:
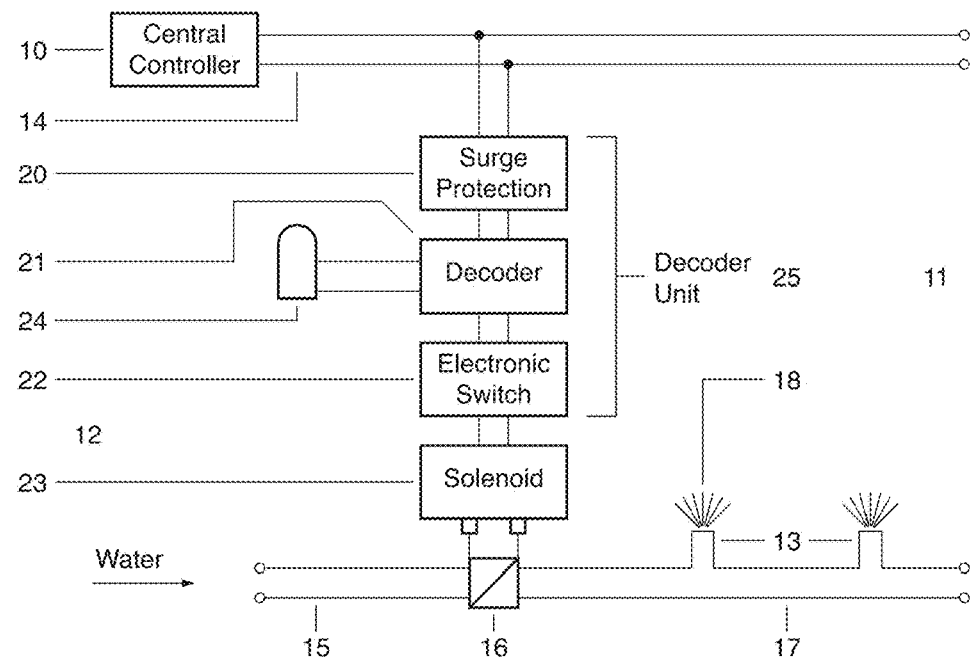
FIG. 1 shows a general block diagram of a watering system using the present invention.

FIG. 1 shows a schematic diagram of a watering system in which the present invention can be used. A central controller 10 has the task of controlling the watering of a larger area, in which several watering stations are arranged at predetermined distances from each other of which FIG. 1 shows only a single watering station 11 which consists of two functional parts, namely a decoder-solenoid valve control assembly 12 and a local watering system 13. The valve control assembly 12 is connected with the central controller 10 with a pair of wires 14 that provides the required power supply for the watering station 11 and coded control pulses can be superimposed on the wires 14 which include respective addresses for the different watering stations followed by appropriate valve command information.

The local watering system 13 typically comprises an inflow water pipe 15, a valve 16 and at least one watering pipe 17 connected to a required number of sprinklers 18 deployed in the vicinity of the watering station 11.

The valve control assembly 12 comprises preferably a surge protection circuit 20, a decoder 21, an electronic switch 22 and finally a solenoid 23 which has the task of operating the valve 16 according to addressed commands received from the central controller 10. The status of the decoder 21 is visually indicated by the actual color of a LED lamp 24. The surge protection circuit 20, the decoder 21, and the electronic switch 23 are arranged on a common single printed circuit board and constitute together a single mechanical unit called as decoder unit 25.

Figure 2:
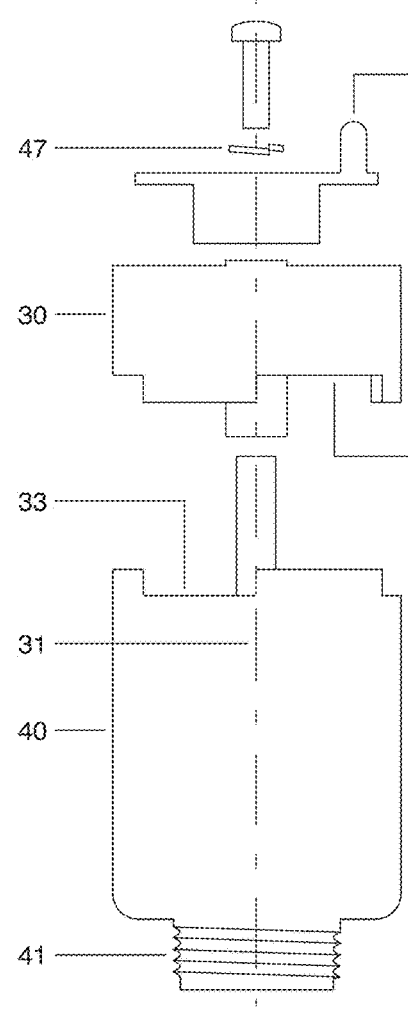
FIG. 2 shows the valve control assembly in exploded view.
Figure 3:
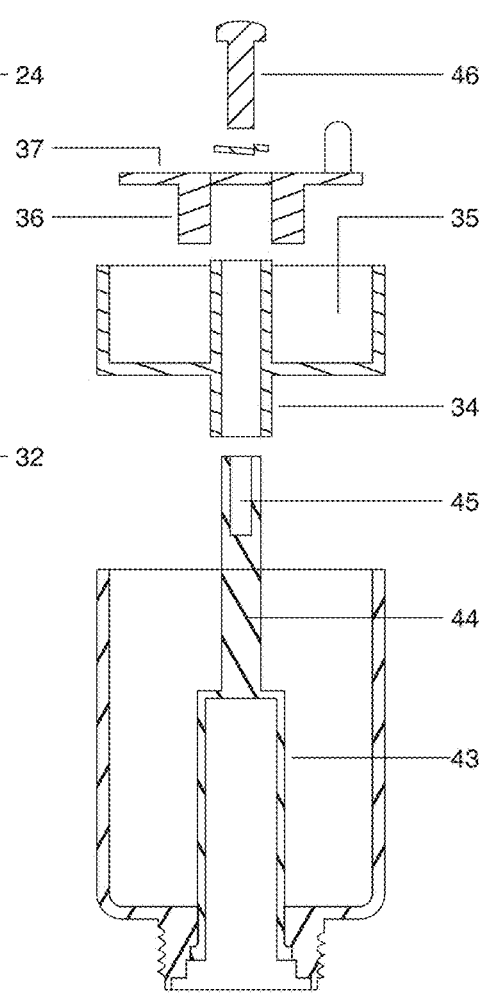
FIG. 3 is similar to FIG. 2 but shows the assembly in section.

Reference is made now to FIGS. 2 and 3 which show the mechanical arrangement of the valve control assembly 12 in exploded illustration, wherein FIG. 3 is a sectional view. The valve control assembly 12 consists of two separate parts, namely the decoder unit 25 and the solenoid 23. Both of these parts have preferably respective upright cylindrical bodies having the same outer diameter and a substantially hollow interior. The upper part is formed by a decoder body 30 that houses the decoder unit 25 and the lower part is formed by solenoid body 40 in which the solenoid 23 is arranged. The decoder body 30 is shorter than the solenoid body 40, and the two bodies 30 and 40 are designed so that they can be releasably attached together to be aligned along a common central axis 31, and their adjoining edges have conforming and matching recesses 32, 33 which can be fitted together so that a continuous mantle surface is obtained, but the conforming recesses 32, 33 prevent angular displacement of the bodies 30, 40 after the parts have been connected.

In the sectional view of FIG. 3 it can be seen that the decoder housing 30 has a central hollow shaft 34 which extends out of the lower end of the decoder housing 30, and a cylindrical space 35 is defined in the interior of the decoder housing 30 around the shaft 34. A circular printed circuit board (PCB) 37 encircling the shaft 34 can be inserted and fixed in this space 35 that holds all components and elements of the decoder unit 25. The printed circuit board 37 is attached to a coil 36 which is part of the surge protection circuit 20. The LED lamp 24 is fixed to the printed circuit board 37 so that a part of it is extending out of it in upward direction, whereby its light can be seen from above.

The solenoid housing 40 has a bottom neck portion 41 provided with a thread, whereby the solenoid housing 40 together with the decoder housing 30 when attached to it, can be releasably connected in a conforming socket made in the body of the valve 16. The solenoid housing has a central shaft extending around the axis 31 which has a hollow lower part 43 and a thinner upper part 44 that extends out of the top of the solenoid housing 40 in upward direction and has a threaded bore 45 in the upper end region. Around the exterior of the thicker lower part 43 a winding 42 is arranged, and when this is energized through the electronic switch 22 controlled by the decoder 21, the generated magnetic field will pull a plunger (not shown) of the valve 16 inserted in and guided for axial displacement in the interior of the lower part 43 and this operates the valve 16 and watering will become active during the period when the winding 42 is energized. A spring (not shown) moves the plunger into base state when the active period is over.

In the exploded view of FIGS. 2 and 3 a threaded bolt 46 and a washer 47 are shown, which connect and releasably attach the decoder body 30 on the top of the solenoid housing 40 after the assembly of the two active parts. The thread of the bolt 46 fits in the thread of the bore 45.

Figure 4:
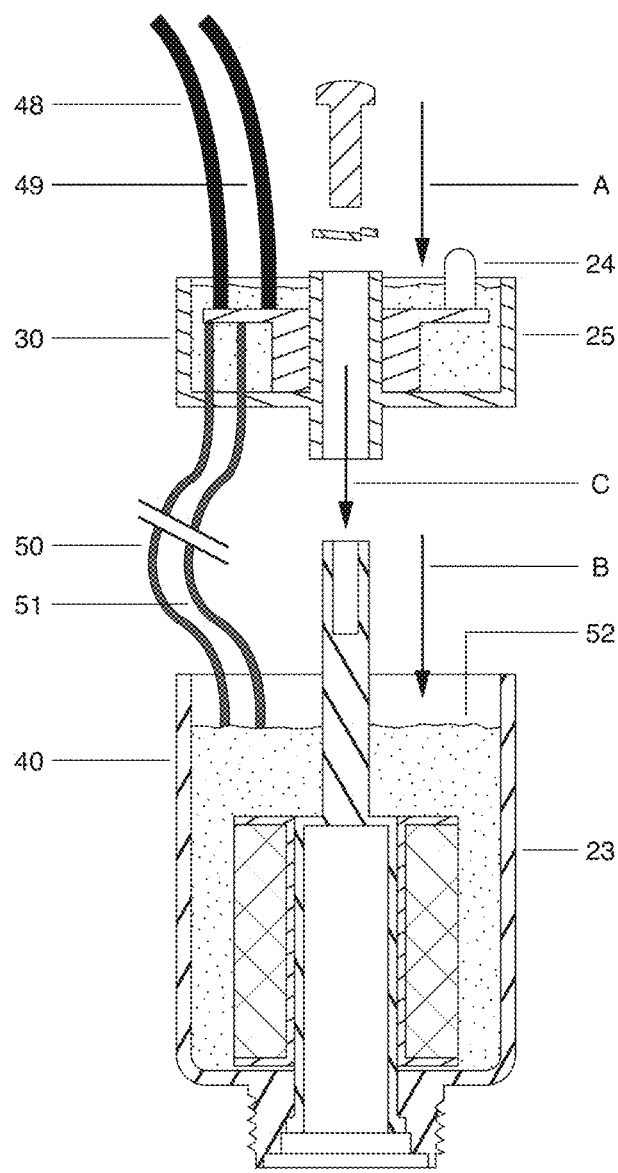
FIG. 4 is an exploded sectional view just before a final assembly.
Figure 5:
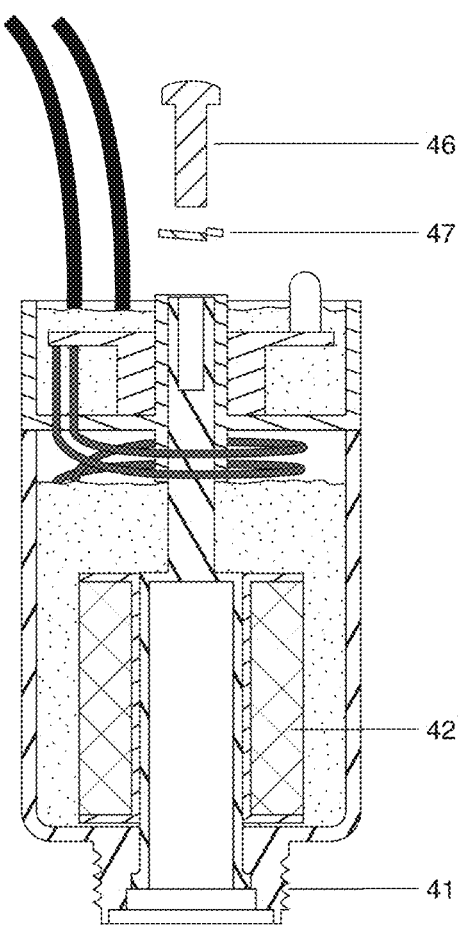
FIG. 5 is the sectional view of the valve control assembly.

Reference is made now to FIGS. 4 and 5 being both respective sectional views, wherein FIG. 4 shows the parts in an exploded view before assembly, and FIG. 5 shows the assembly in which the parts are coupled to each other. The decoder body 30 forms a self contained mechanical unit that contains the circuits of the decoder unit 20 and it is connected to the central wires 14 (FIG. 1) by means of two connection wires 48, 49, the ends of which are soldered in the appropriate ports of the PC board 37. The solenoid 23 is a second self contained mechanical unit, and it is connected through control wires 50, 51 with a pair of output ports in the decoder unit 25. It is important to note that the control wires 50, 51 have a predetermined length which enable separation of the two parts up to a certain distance, so that the presence of the wires 50, 51 cannot prevent dis-assembly of the two parts.

Before a final assembly it is preferred, if the interior of the two parts i.e. the decoder body 30 and the solenoid housing 40 are separately filled (saturated) by an appropriate thermoplastic material that fills all gaps and spaces and fixes the position of the components there. The filling step also called potting takes place from the direction of arrows A and B shown in FIG. 5. The filling material should not reach to the top of the solenoid housing 40, since a space 52 should be left for receiving the control wires 50 and 51 when the parts are attached to each other. Following the setting or hardening of the filling material, the two parts are moved in axial direction along arrow C, and the position shown in FIG. 5 is taken.

The control wires 50, 51, which are between about 80 to 150 mm long, take a form of a short coil in the space 52 provided for them. The conforming recesses 32, 33 are required to prevent angular displacement of the two parts when attached together, which could otherwise tear the wires 50, 51. When the bolt 46 is inserted and tightened in the bore 45, the valve control assembly 12 according to the invention will be a combined mechanical unit that can be inserted in the valve 16 by means of the threaded neck portion 41 of the solenoid body 40.

The presence of the surge protection circuit 20 in the decoder unit 25 improves reliability and decreases the danger caused by sudden high voltage pulses that can get superimposed on the wires 14 e.g. during a storm, however, it cannot provide a 100% safe protection. In case the decoder unit 25 has a malfunction or stops operating, its replacement is an easy job, because after unscrewing the bolt 46 the two parts can be separated, and the control wires 50, 51 have sufficient length that by cutting a central portion, the wires of a replacement new decoder unit can be connected thereto. A preferred connection could be the use of a thin metal tube called a ferrule placed around the stripped wire ends and the squeezing of the tube by an appropriate tool, and sliding and gluing a short insulating sleeve over the connection zone. Of course, there are numerous ways of connecting wire ends, and the invention is not limited to any particular way as to how the connection is made. The length of the control wires 50, 51 is sufficient for multiple replacements.

Although the solenoid 23 is more reliable than the decoder unit 25 as it does not comprise sensitive semiconductor components, if any problem occurs, the whole solenoid 23 can be replaced just as described for the decoder unit 25.

The valve control assembly 12 designed according to the present invention appears to provide a very simple and easy way of improving reliability and facilitating (or enabling) replacement of any of the two parts when they become faulty, it represents a great step forward compared to the integrated single body and housing of the prior art, while the advantages provided by easy handling and the small single self-contained realization are preserved and connected with the improved reliability and the possibility of the replacement of any of the two constituting parts.

The invention claimed is:

1. A valve control assembly for a watering system supplied through wires (14) that carry superimposed coded control information, comprising said wires (14) and a decoder unit (25) connected with said wires (14) and having a decoder (21) and a switch (22) and provided with valve control outputs, and a solenoid (23) that can be releasably attached to a valve (16) in the system for controlling the same upon excitation received from the decoder unit and obtaining excitation from the valve control outputs of the decoder unit (25), wherein the decoder unit (25) is arranged in a decoder body (30) having a substantially cylindrical shape and a central axis (31) and the solenoid (31) is arranged in a substantially cylindrical solenoid housing (40), the decoder body (25) and the solenoid housing (40) can be releasably attached together at a connection zone so that in attached position their axes fall in the same line and their edges along which they are united at said connection zone have respective conforming recesses (32, 33) that are fitted together and prevent angular displacement, and in the interior of the decoder body (30) and the solenoid housing (40) above and under said connection zone a hollow space (52) is defined, and control wires (50, 51) connecting the decoder unit (25) with the solenoid (23) are placed in said hollow space and said control wires (50, 51) have excess length that enable disassembly and in case of need replacement of any of the decoder unit (25) and the solenoid (23).

2. The valve control assembly as claimed in claim 1, wherein the decoder unit (25) comprises a surge protection circuit (20) connected between the wires (14) and input of the decoder (21).

3. A valve control assembly for a watering system supplied through wires (14) that carry superimposed coded control information, comprising wires (14) and a decoder unit (25) connected with said wires (14) and having a decoder (21) and a switch (22) and provided with valve control outputs, and a solenoid (23) that can be releasably attached to a valve (16) in the system for controlling the same upon excitation received from the decoder unit and obtaining excitation from the valve control outputs of the decoder unit (25), wherein the decoder unit (25) is arranged in a decoder body (30) having a substantially cylindrical shape and a central axis (31) and the solenoid (31) is arranged in a substantially cylindrical solenoid housing (40), the decoder body (25) and the solenoid housing (40) can be releasably attached together at a connection zone so that in attached position their axes fall in the same line and their edges along which they are united at said connection zone have respective conforming recesses (32, 33) that are fitted together and prevent angular displacement, and in the interior of the decoder body (30) and the solenoid housing (40) above and under said the connection zone a hollow space (52) is defined, and control wires (50, 51) connecting the decoder unit (25) with the solenoid (23) are placed in said hollow space and said control wires (50, 51) have excess length that enable disassembly and in case of need replacement of any of the decoder unit (25) and the solenoid (23), wherein the decoder body (30) has a hollow central shaft (34) and the solenoid housing (40) has a central shaft with a first part (43) designed as a hollow cylinder opening towards said valve (16) and a second part (44) narrower than the first part (43) and extending out of the open end of the solenoid housing (40) and in assembled state the second part (44) is introduced in the hollow interior of the central shaft (34) of the decoder body (3) to enable the releasable connection of the decoder body (30) and the solenoid body (40).

4. The valve control assembly as claimed in claim 1, wherein before the assembly of the decoder body (30) and the solenoid housing (40) the interiors of both of them being separately filled by a self-solidifying material.

5. The valve control assembly as claimed in claim 1, wherein the control wires (50, 51) are wound in the form of a short coil in the space (52) provided for them, and having a length between about 80 and 150 mm.

6. The valve control assembly as claimed in claim 1, wherein the decoder unit (25) comprises a LED lamp (24) indicating the status of the decoder unit (25).

7. The valve control assembly as claimed in claim 3, wherein the decoder unit (25) comprises a surge protection circuit (20) connected between the wires (14) and input of the decoder (21).

8. The valve control assembly as claimed in claim 3, wherein before the assembly of the decoder body (30) and the solenoid housing (40) the interiors of both of them being separately filled by a self-solidifying material.

9. The valve control assembly as claimed in claim 3, wherein the control wires (50, 51) are wound in the form of a short coil in the space (52) provided for them, and having a length between about 80 and 150 mm.

10. The valve control assembly as claimed in claim 3, wherein the decoder unit (25) comprises a LED lamp (24) indicating the status of the decoder unit (25).

* * * * *